US008851895B1

(12) United States Patent
Morrison

(10) Patent No.: US 8,851,895 B1
(45) Date of Patent: Oct. 7, 2014

(54) METHOD AND SYSTEM FOR TEACHING AND PRACTICING ARTICULATION OF TARGETED PHONEMES

(76) Inventor: Elizabeth M. Morrison, St. Louis, MO (US)

(*) Notice: Subject to any disclaimer, the term of this patent is extended or adjusted under 35 U.S.C. 154(b) by 1373 days.

(21) Appl. No.: 12/021,818

(22) Filed: Jan. 29, 2008

(51) Int. Cl.
*G09B 19/04* (2006.01)
*G09B 1/00* (2006.01)

(52) U.S. Cl.
USPC .......................................... 434/185; 434/172

(58) Field of Classification Search
USPC ......... 434/128, 129, 156, 167, 171, 172, 178, 434/185; 273/236, 272, 293, 299, 302
See application file for complete search history.

(56) References Cited

U.S. PATENT DOCUMENTS

| | | | | |
|---|---|---|---|---|
| 1,282,513 A | * | 10/1918 | Withington | ............... 273/153 R |
| 1,383,097 A | | 6/1921 | Gibson | |
| 1,401,341 A | | 12/1921 | McDade | |
| 1,603,129 A | | 10/1926 | McDade | |
| 1,790,287 A | | 1/1931 | Stevens et al. | |
| 2,204,931 A | | 6/1940 | Gonzalez | |
| 2,493,668 A | | 1/1950 | Gonzalez | |
| 2,722,061 A | | 11/1955 | Webster | |
| 2,728,997 A | * | 1/1956 | Gross | ........................... 434/167 |
| 2,917,325 A | | 12/1959 | Sines | |
| 2,946,137 A | | 7/1960 | Worth et al. | |
| 3,333,351 A | | 8/1967 | Williams | |
| 3,389,480 A | | 6/1968 | Holland | |
| 3,497,967 A | * | 3/1970 | French et al. | ................. 434/178 |
| 3,704,338 A | | 11/1972 | Shore | |
| 4,204,343 A | * | 5/1980 | Brooks | ......................... 434/172 |
| 4,419,080 A | | 12/1983 | Erwin | |
| 4,445,869 A | | 5/1984 | Wasserman | |
| 5,169,316 A | * | 12/1992 | Lorman et al. | ................ 434/185 |
| 5,401,032 A | * | 3/1995 | Barnhart et al. | ............. 273/293 |
| 5,429,513 A | | 7/1995 | Diaz-Plaza | |
| 5,474,456 A | | 12/1995 | Paiken | |
| 5,551,878 A | | 9/1996 | Ellenbogen | |
| 5,788,502 A | | 8/1998 | Shea | |
| 5,799,267 A | * | 8/1998 | Siegel | .............................. 704/1 |
| 5,895,219 A | | 4/1999 | Miller | |
| 6,009,397 A | * | 12/1999 | Siegel | .......................... 704/270 |

(Continued)

FOREIGN PATENT DOCUMENTS

KR 2007037860 A * 4/2007

OTHER PUBLICATIONS

Super Duper Inc., Super Duper Publications, Fun Educational Materials!, pp. 36, 242, © 2006.

(Continued)

*Primary Examiner* — Gene Kim
*Assistant Examiner* — Alyssa Hylinski
(74) *Attorney, Agent, or Firm* — Grace J. Fishel

(57) ABSTRACT

A method and system for teaching and practicing articulation of targeted phonemes for use in the treatment of various speech sound disorders including problems with articulation, phonological processes, voice and resonance. A student chooses cards intentionally or randomly from a deck and places them on spaces provided in a story template. The cards include words or images that contain the phoneme to be practiced and which are appropriate for completing the story. The student then reads the story orally or just the words on the cards inserted into the spaces thereby drilling on the phoneme to be practiced. The student also has an opportunity to use learned phonemes in conversational speech in response to questions.

15 Claims, 6 Drawing Sheets

(56) References Cited

U.S. PATENT DOCUMENTS

| | | | |
|---|---|---|---|
| 6,210,172 B1* | 4/2001 | Clements | 434/428 |
| 6,328,569 B1* | 12/2001 | Jenkins et al. | 434/169 |
| 7,110,945 B2 | 9/2006 | Cogliano | |
| 7,172,427 B2* | 2/2007 | Kaul | 434/178 |
| 7,942,674 B2* | 5/2011 | Murphy | 434/156 |
| 2004/0102973 A1 | 5/2004 | Lott | |
| 2005/0032027 A1 | 2/2005 | Patton et al. | |
| 2005/0102143 A1* | 5/2005 | Woodward | 704/254 |
| 2006/0055111 A1* | 3/2006 | DeWeese | 273/292 |
| 2007/0105079 A1 | 5/2007 | O'Toole et al. | |
| 2008/0252014 A1* | 10/2008 | Hathorn | 273/299 |

OTHER PUBLICATIONS

Super Duper Inc., Super Duper Publications, Fun New Products and More!, pp. 1, 2, © 2007.

\* cited by examiner

METHOD AND SYSTEM FOR TEACHING AND PRACTICING ARTICULATION OF TARGETED PHONEMES

BACKGROUND OF THE INVENTION

1. Field of the Invention

The present invention relates to an interactive method and system for teaching and practicing articulation of targeted phonemes, particularly for children, that is both attractive and interesting to its users. The method and system may be used to treat various speech sound disorders including problems with articulation, phonological processes and resonance.

2. Brief Description of the Prior Art

The term articulation refers to the act or manner of producing a sound. A "phoneme" is the smallest unit of significant sound in a specific language. For effective oral communication, a person must be able to reproduce the phonemes making up a language correctly. An articulation disorder involves problems making sounds. Sounds can be substituted, left off, added or changed. Young children often make such speech errors such as, for example, substituting a "w" sound for an "r" sound, e.g., "wabbit" for "rabbit" or omitting sounds from words, such as "nana" for "banana."

Articulation problems if left unchecked can lead to reading and spelling difficulties, social challenges, and self-esteem problems. Correcting articulation problems requires tedious repetition of the targeted phonemes which are being mispronounced. Currently this is typically accomplished with drill work using word cards or picture/word worksheets.

With current teaching methods, it is very difficult to maintain the student's attention and cooperation because the flash cards and worksheets give the student little opportunity to actively participate in the learning process. The present invention addresses the problem of boredom with a method and system which makes the repetition of the targeted phonemes less tedious and more fun.

Other speech sound disorders may also be treated by practicing the pronunciation of words containing targeted phonemes. These include phonological process disorders such as substituting sounds made in the back of the mouth like "k" and "g" for those in the front of the mouth like "t" and "d", e.g., saying "tup" for "cup" or "das" for "gas." Other phonological process errors occur with words that start with two consonants, such as broken or spoon. When children do not follow this rule of speech and say only one of the sounds, e.g. "boken" for "broken" or "poon" for "spoon," it is more difficult for the listener to understand the child.

Resonance is the quality of the voice that is determined by the balance of sound vibration in the oral, nasal and pharyngeal cavities during speech. Abnormal resonance can occur if there is obstruction in one of the cavities, causing hyponasality or cul-de-sac resonance, or if there is velopharyngeal dysfunction, causing hypernasality and/or nasal emission. Some oral/nasal resonance disorders may be treated by practicing the pronunciation of words containing targeted phonemes. Such treatment is appropriate for those children who demonstrate phoneme-specific nasality or nasal emission due to faulty articulations.

BRIEF SUMMARY OF THE INVENTION

In view of the above, it is an object of the present invention to provide an interactive method and system for teaching and practicing articulation of targeted phonemes. It is another object to provide a method and system that may be crafted to fit the needs of the individual student. It is also an object to provide a versatile method and system that may be used by a speech pathologist, reading teacher or parent at home. Other objects and features of the invention will be in part apparent and in part pointed out hereinafter.

In accordance with the present invention, a method and system for teaching and practicing articulation of a targeted phoneme includes a sheet of text with a story template with spaces wherein key portions have been omitted. A deck of cards is provided with cards sized to fit into the spaces on the template. The cards have words or images corresponding to words containing a targeted phoneme and being appropriate for insertion in the omitted key portions of the story template.

In use, a student inserts cards from the deck into the empty spaces to complete the story and then reads the entire story or just the words inserted to practice the phoneme that he or she is having difficulty with. The method and system is useful in the treatment of various speech sound disorders including problems with articulation, phonological processes and, in some cases, resonance wherein drill work on a targeted phoneme is helpful.

The invention summarized above comprises the method and system hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 2:
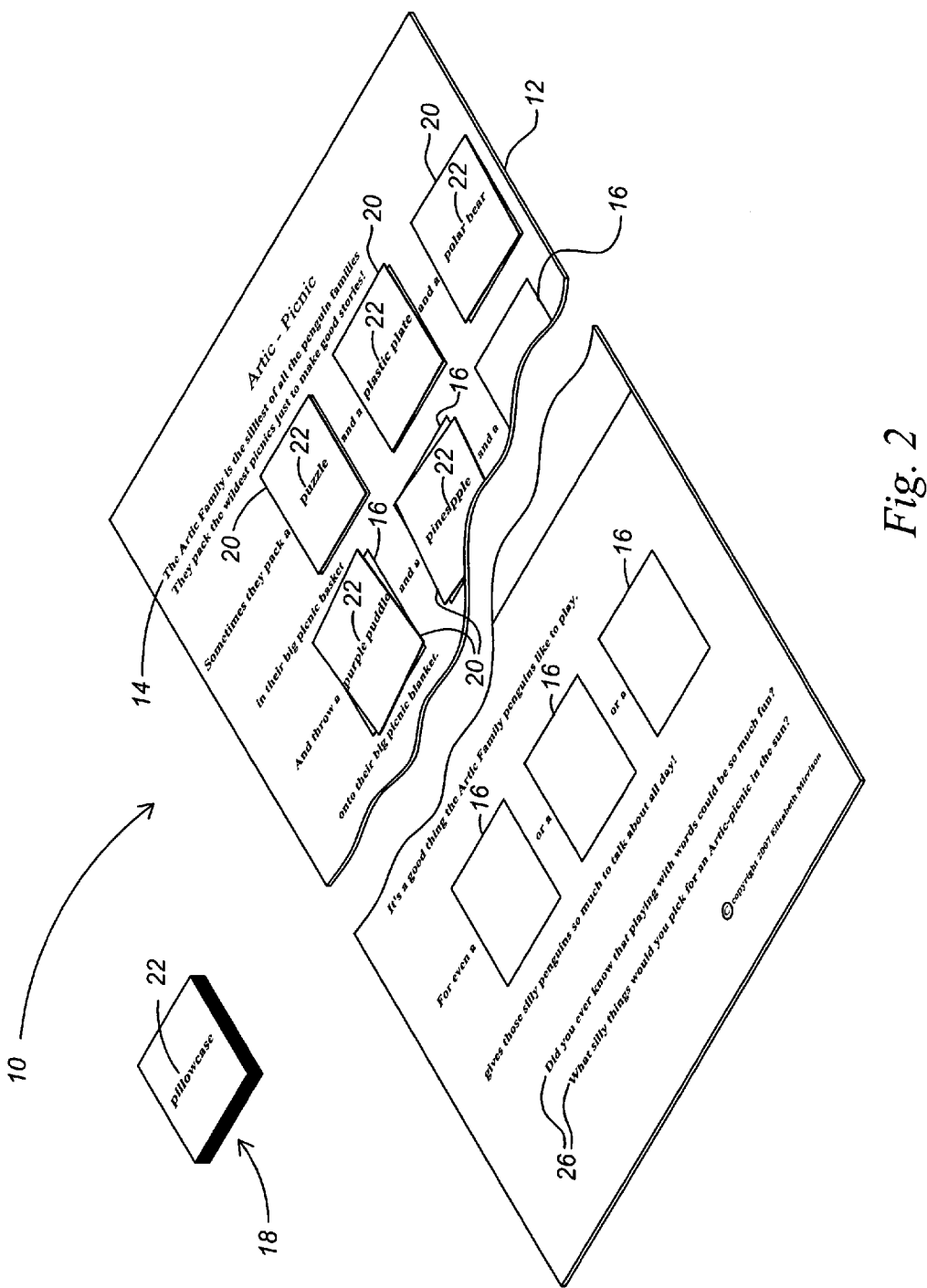
FIG. 2 is an enlarged perspective view of the system wherein the phoneme is an initial [p] and the words are nouns.
Figure 3:
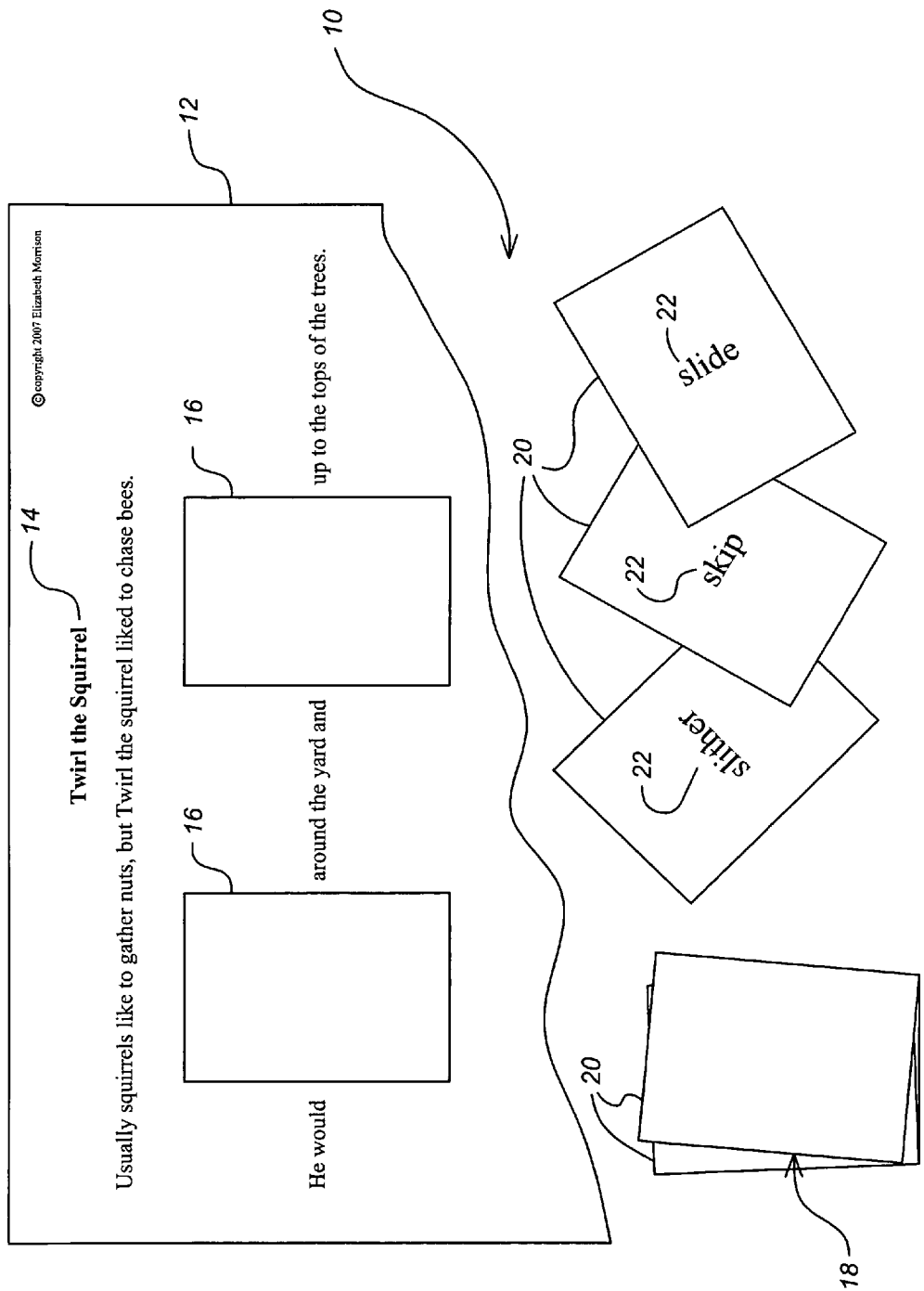
FIG. 3 is a plan view of the system wherein the phoneme is an initial [s] blend and the words are verbs.
Figure 4:
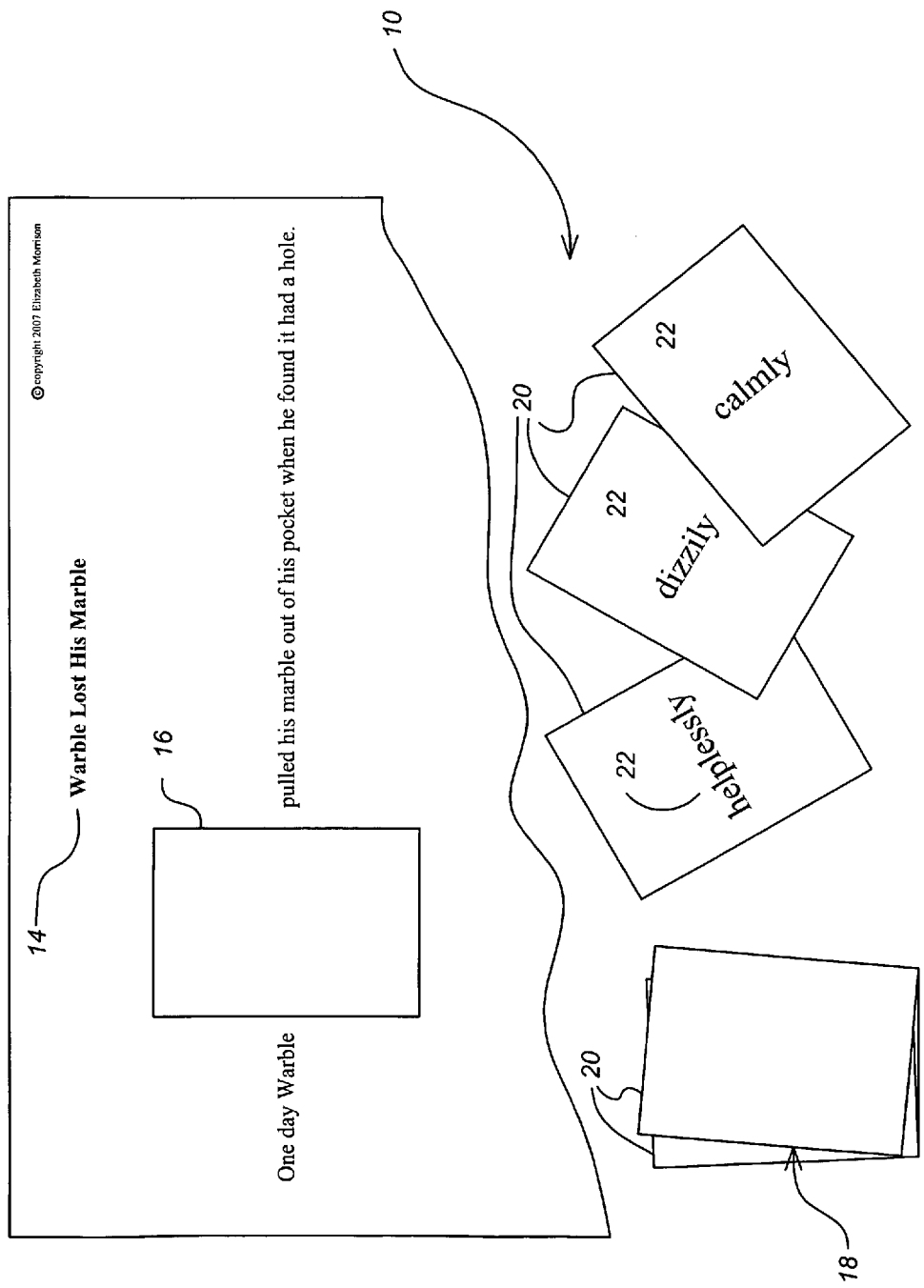
FIG. 4 is a plan view of the system wherein the phoneme is a medial [l] and the words are adverbs.
Figure 5:
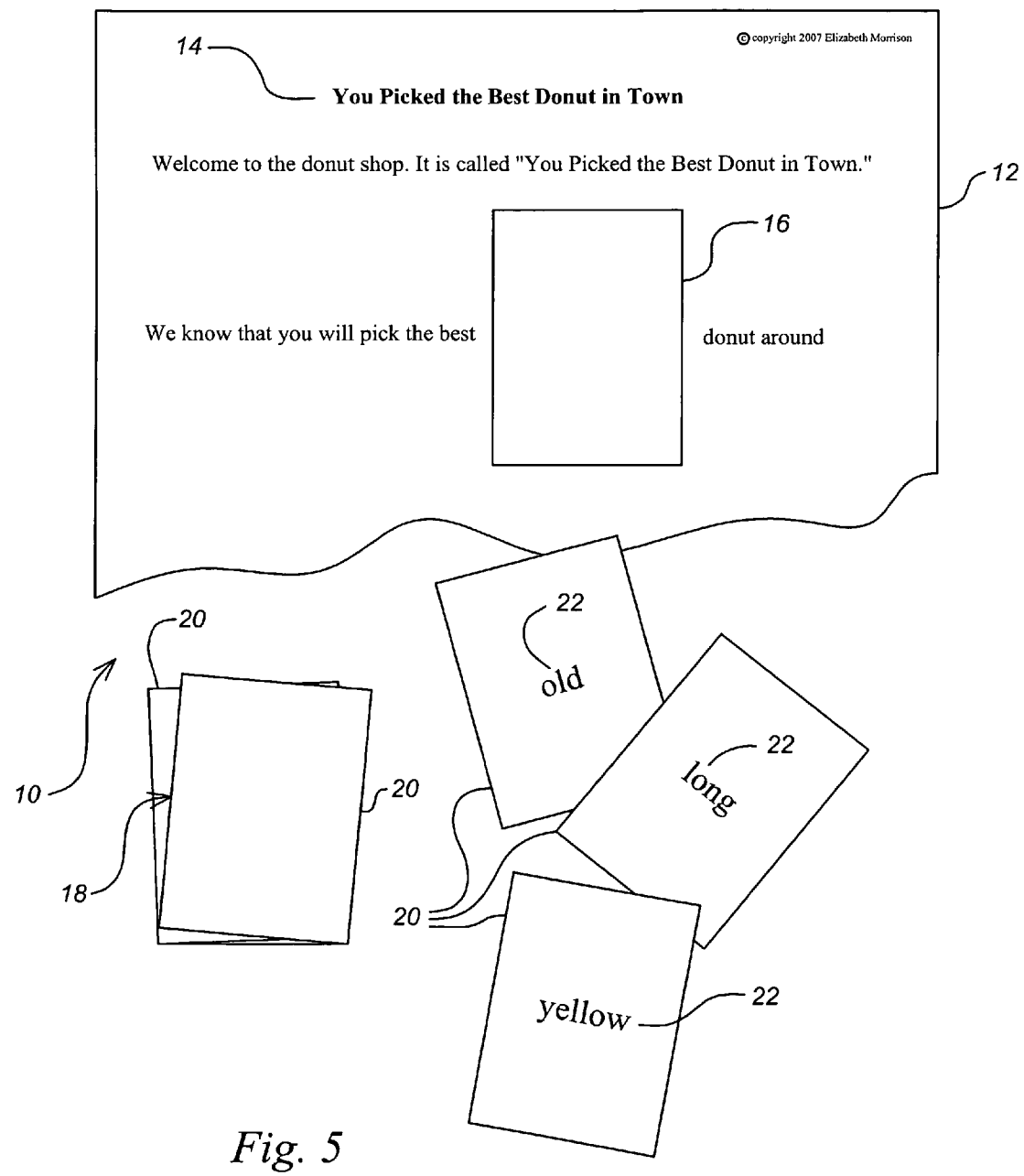
FIG. 5 is a plan view of the system wherein the phoneme is [l] and the words are adjectives; and, FIG. 6 is a plan view of the system wherein the phoneme is an initial [b] and the words are prepositions.
Figure 6:
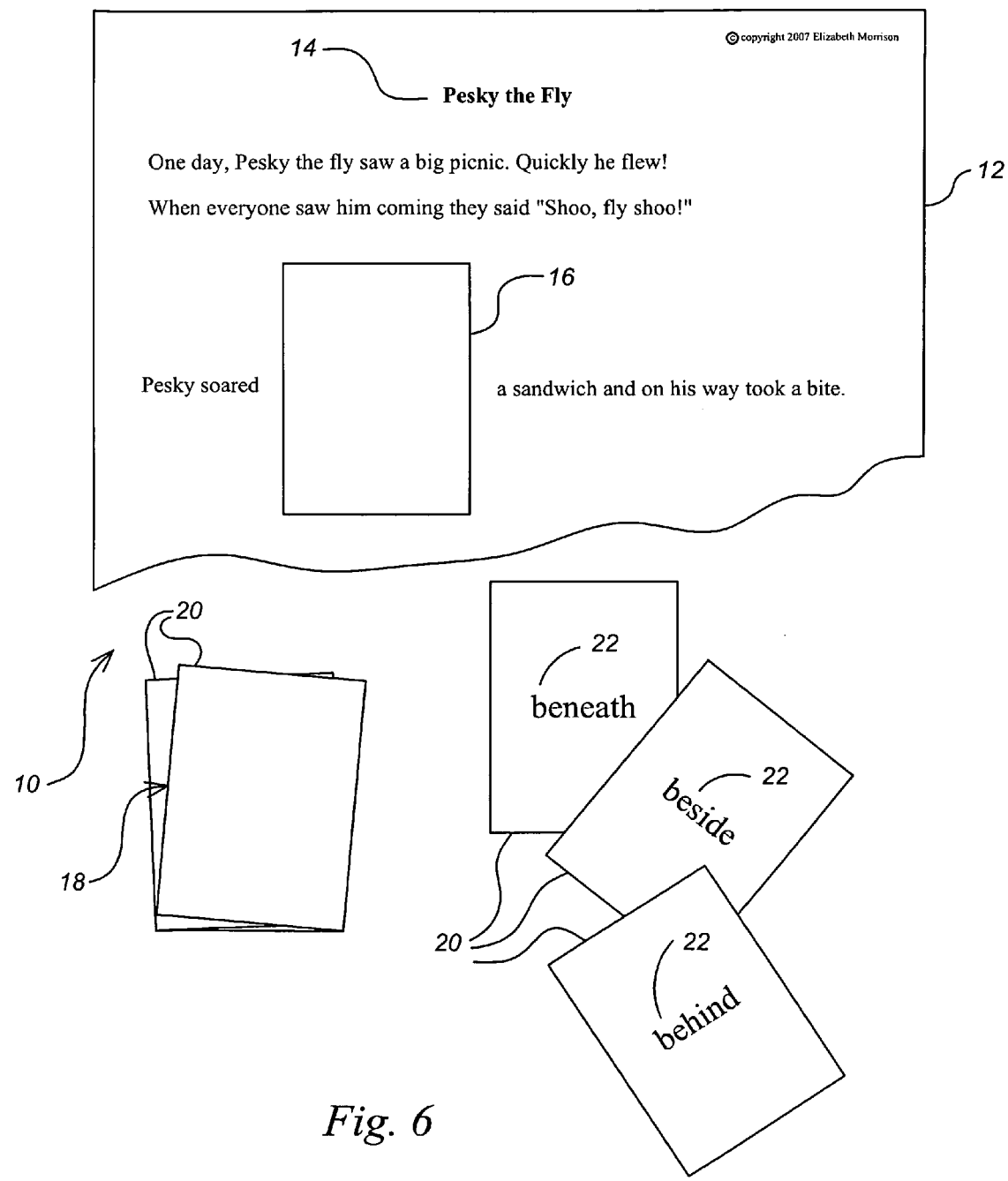

Referring to the drawings more particularly by reference character, reference numeral 10 refers to a system for teaching and practicing articulation of a targeted phoneme in accordance with the present invention. The system includes at least one sheet of text 12 comprising a story template 14 with spaces 16 wherein key portions of the story have been omitted. The system further includes a deck 18 of cards 20 on which different words 22 or images are provided that contain the phoneme to be practiced. Cards 20 are sized to fit into spaces 16 on story template 14 and words 22 or images for use in story template 14 may be nouns as shown in FIG. 2, verbs (FIG. 3), adverbs (FIG. 4), adjectives (FIG. 5) or, less commonly, prepositions (FIG. 6).

Figure 1:
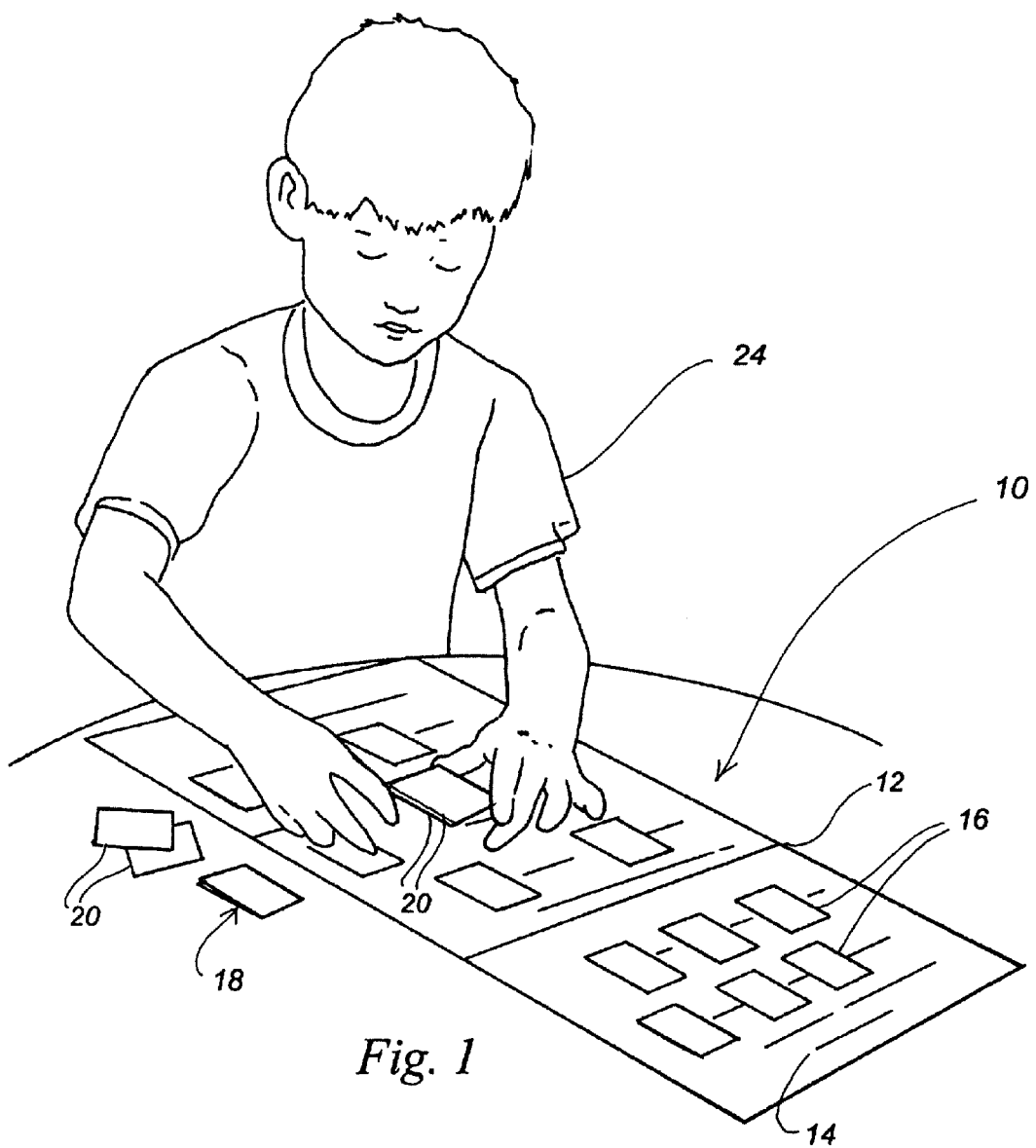
FIG. 1 is a perspective view of a student using a system for teaching and practicing articulation of a targeted phoneme in accordance with the present invention.

In use, a student 24 as shown in FIG. 1 may complete the story by inserting selected cards 20 from deck 18 into spaces 16. The cards 20 inserted into spaces 16 may be planned or unplanned. That is, cards 20 may be deliberatively chosen by student 24 from deck 18 or dealt randomly from deck 18. In either instance, a wholly unique and interesting story is created by student 24 through the use of word/image cards 20.

Since the story will vary with cards 20 and the order in which cards 20 are inserted into spaces 16, the number of possible stories is only limited by the number of cards 20 and spaces 16 to be filled. The story is very often funny and may then be read orally by student 24 individually or responsively with a teacher or parent reading the template portion and the student reading words 22 with the targeted phoneme on cards 20 that have been placed into the story. In the case of pre-reading students images are provided on cards 20 and a parent or teacher may read the template story and student 24 pronounce the words corresponding with the picture cards 20.

Each story may conclude with one or more questions 26 asked of the student. In making an answer, student 24 will have the opportunity to demonstrate articulation, voice and/or resonance skills in spontaneous and conversational speech. The drill work of practicing words with targeted phonemes is thus made less tedious because student 24 is actively involved in the learning process, first in the creative construction of a story and then in answering questions 26 which may be open-ended. Student attention and cooperation is improved and boredom reduced.

The targeted phonemes may include initial consonants, medial, final, blends or a combination as meets the needs of the individual student 24. The words or images selected to practice the targeted phoneme should be age appropriate for the student. This allows the system to be an adaptable tool for articulation training. It also allows system 10 to grow with student 24 as the student progresses. System 10 may be used with multiple students by providing different decks 18 of cards 20 to drill upon different phonemes or combinations of phonemes adapted to the needs of each student.

The following table illustrates various phonemes and words 22 which may be used on cards 20. It will be understood that the phonemes and words 22 shown are illustrative and not limiting, there being other phonemes and words that can be used to practice them. In the table, letters in brackets are the phonetic symbol for the phoneme as well as the English letter for it while letters listed in quotes are acoustic representations (i.e., how it sounds) as the phonetic symbol for these phonemes is different from the letter representation.

| PHONEME | DESCRIPTION | INITIAL EX. | MEDIAL EX. | FINAL EX. |
|---|---|---|---|---|
| [m] | Bilabial nasal | me mom make money more | mommy coming almost hammer | come farm him home same them |
| [p] | Voiceless bilabial | pie pail pet put pony | apple upon happy open | chop cap keep stop shop wipe |
| [b] | Voiced bilabial | back big boy book both | rabbit about baby robber table | grab cab web robe scrub jab rib bribe |
| [w] | Labial glide | walk water way weed with | always anyway between reward | doesn't occur in the final//it is actually [o] like in "mow" or a diphthong "cow" |
| [n] | Nasal lingual tip alveolar | no night knit never nail | money another under dinner many | again barn down own ten soon |
| [t] | Voiceless lingual tip alveolar | table today taste take tie tool teach | after butter better party rotate | hot boat cat cut feet light |
| [d] | Voiced lingual tip alveolar | dance day date dime ditch | body candy ready today | bed did could read need ride |
| [f] | Voiceless labial dental fricative | fix face far fall find fox fuss | after before coffee soften | calf beef chief half knife leaf |
| [v] | Voiced labial dental fricative | veil view vet vacation visit | clever even gravy never evil | above dive believe drive five give love |
| [s] | Voiceless fricative | see sat seal sigh sick sorry | asleep basket missing history essay | house niece place pass fuss |
| [z] | Voiced fricative | zoo zero zip zest zeal | busy closet cousin fuzzy lazy | buzz his plays these size was choose |
| "sh" | Voiceless affricate | shoe sharp shop ship show | wishes ashes sunshine ocean | dish finish crash fresh |
| "ch" | Voiceless affricate | cheap chop chair church | butcher kitchen teacher touchy | beach much such rich watch |
| "j" | Voiced affricate | jar jam jaw jello Jupiter | bridges changer register soldier | edge manage large huge cage orange forge |
| "th" | Voiceless lingual dental fricative | thought thank third thick | anything bathtub healthy nothing | bath booth teeth path cloth oath myth |
| "th" | Voiced lingual dental fricative | than that this these they there | father brother another weather | bathe breathe soothe smooth |
| [k] | Voiceless velar | key cut cot car come cup kick | because picnic picture likely | work walk took milk luck |
| [g] | Voiced velar | go gum game give gift guess | again began finger legal forget | big frog spring snag peg bug snug |
| [l] | Glide | lots lemon large last | follow hello yellow pilgrim | fell style call bicycle crawl |

-continued

| PHONEME | DESCRIPTION | INITIAL EX. | MEDIAL EX. | FINAL EX. |
|---|---|---|---|---|
| [r] | Glide | roam rumble runner | carrot borrow tomorrow hero | her wear wire fear far |
| [st] | Cluster | stop stare start step | hostile hastily master wasted | worst nest last fast taste |

Sheet of text 12 may be disposable or may be provided as a stiff sheet of material constructed from plastic, cardboard or other similar rigid and light weight material. Because sheet of text 12 and deck 18 of cards 20 are portable, system 10 may be used by student 24 in a classroom, direct intervention therapy sessions, at home, or virtually anywhere else. This permits frequent reinforcement of the lessons taught by system 10.

Method and system 10 for teaching articulation is designed to be versatile in its application and is not limited to just articulation disorders. For example if student 24 is learning to control oral versus nasal resonance or improve voice production skills such as pitch or easy onset of phonation, he or she can also make use of method and system 10. As above mentioned, method and system 10 may also be used to correct phonological process errors by focusing on mispronounced phonemes.

In view of the above, it will be seen that the several objects of the invention are achieved and other advantageous results attained. As various changes could be made in the above method and system without departing from the scope of the invention, it is intended that all matter contained in the above description or shown in the accompanying drawings shall be interpreted as illustrative and not in a limiting sense.

What is claimed:

1. In a story game teaching method wherein a student is provided with at least one sheet of text with a story template with spaces wherein key portions have been omitted, the improvement comprising limiting the omitted key portions to words of a single part of speech;

selecting words (a) which are appropriate to the single part of speech and (b) which also contain only one targeted phoneme;

displaying the selected words as written words or images on cards forming a deck of cards;

providing a student with the deck of cards, each of said cards sized to fit into any of said omitted spaces and every of said cards having a word containing the one specific targeted phoneme, said phoneme on each of the cards in the deck being the same as the phoneme on the other cards and being a smallest unit of significant sound in a language being practiced, said words or images being appropriate for insertion in the omitted key portions of the story template;

permitting the student to complete the story by inserting one selected card from the deck of cards into each of the omitted key portions; and, allowing the student to practice the articulation of the one specific targeted phoneme contained in the word or image on the inserted cards by reading the completed story aloud to a speech pathologist, reading teacher or parent for correction of mispronunciation of the phoneme in any of the words inserted by the student in the story template, whereby an interactive and interesting speech therapy method is provided for drilling the student on correctly pronouncing the targeted phoneme.

2. The method of claim 1 wherein the omitted key portions are nouns, verbs, adjectives, adverbs or prepositions.

3. The method of claim 1 wherein the text includes a question following the story that gives the student an opportunity to demonstrate comprehension of the story.

4. The method of claim 3 wherein the question is open ended to give the student the opportunity to conversationally relate his or her own experiences.

5. The method of claim 1 wherein the one specific targeted phoneme is a bilabial, lingual, fricative, affricate, velar, glide or cluster.

6. The method of claim 5 wherein the bilabial is [m], [p] or [b].

7. The method of claim 5 wherein the lingual is [n], [t] or [d].

8. The method of claim 5 wherein the fricative is [f], [v], [s], [z] or "th."

9. The method of claim 5 wherein the affricate is "sh", "ch" or "j".

10. The method of claim 5 wherein the velar is [k] or [g].

11. The method of claim 5 wherein the glide is [w], [l], or [r].

12. The method of claim 5 wherein the cluster is [st].

13. The method of claim 1 wherein the words and images on the cards are age appropriate for the student.

14. The method of claim 1 wherein the selection of the cards inserted into the omitted key portions is planned.

15. The method of claim 1 wherein the selection of the cards inserted into the omitted key portions is random.

\* \* \* \* \*